United States Patent
Ooyama et al.

(10) Patent No.: US 6,785,314 B2
(45) Date of Patent: Aug. 31, 2004

(54) ELECTRIC DISCHARGE GAS LASER

(75) Inventors: Atushi Ooyama, Kanagawa-ken (JP); Shinichi Sekiguchi, Kanagawa-ken (JP); Hiroyuki Shinozaki, Kanagawa-ken (JP); Toshimitsu Barada, Kanagawa-ken (JP); Toshiharu Nakazawa, Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/876,032

(22) Filed: Jun. 8, 2001

(65) Prior Publication Data

US 2001/0050940 A1 Dec. 13, 2001

(30) Foreign Application Priority Data

Jun. 8, 2000 (JP) ........................................ 2000-172233

(51) Int. Cl.⁷ ................................................ H01S 3/09
(52) U.S. Cl. .............................. 372/55; 372/69; 372/57; 372/58
(58) Field of Search ...................... 372/55, 32; 318/268

(56) References Cited

U.S. PATENT DOCUMENTS

| | | | | |
|---|---|---|---|---|
| 5,848,089 A | * | 12/1998 | Sarkar et al. | .................. 372/58 |
| 6,366,039 B1 | * | 4/2002 | Sekiguchi et al. | ........... 318/268 |
| 6,532,246 B1 | * | 3/2003 | Fukuyama et al. | ............ 372/57 |
| 6,535,539 B1 | * | 3/2003 | Nakao et al. | ................... 372/69 |
| 6,539,043 B1 | * | 3/2003 | Shinozaki et al. | ............. 372/59 |
| 6,577,664 B1 | * | 6/2003 | Nara et al. | ..................... 372/58 |

FOREIGN PATENT DOCUMENTS

| | | | |
|---|---|---|---|
| JP | 2527246 | | 11/1996 |
| JP | 10-103288 | | 4/1998 |
| JP | 11-101233 | * | 4/1999 |

OTHER PUBLICATIONS

English translation of Japanese Public Patent Disclosure No. Hei 11–101233.

* cited by examiner

*Primary Examiner*—Don Wong
(74) *Attorney, Agent, or Firm*—Wenderoth, Lind & Ponack, L.L.P.

(57) ABSTRACT

There is provided an electric discharge gas laser comprising a housing, a rotating fan, a bearing device and a control. The housing contains a laser gas. The rotating fan is provided in the housing to circulate the gas in the housing. The bearing device magnetically supports a rotating shaft. The bearing device is provided with a sensor device comprising a sensor and a signal processor. The sensor senses the position of the rotating shaft to generate signals indicating the position of the rotating shaft. The signal processor receives and processes the signals delivered from the sensor to output processed signals. The control is separated from the bearing device and is functionally associated with the bearing device to receive the processed signal from the sensor device for controlling the bearing device on the basis of the processed signals.

3 Claims, 5 Drawing Sheets

ELECTRIC DISCHARGE GAS LASER

BACKGROUND OF THE INVENTION

The present invention relates to an excimer laser or electric discharge gas laser comprising a magnetic bearing device which is adapted to support a shaft of a rotating fan provided in a laser housing to circulate a gas in the housing. Specifically, the present invention is directed to an excimer laser comprising a magnetic bearing device which insures easy replacement of a magnetic bearing mechanism body or a control device of the laser.

FIG. 1 shows an example of an arrangement of a conventional excimer laser. The excimer laser comprises a laser body 10 and a control device 20. The laser body 10 comprises a laser housing 11 containing a gas used for generating a laser beam, a rotating fan 12 provided in the laser housing 11 to circulate the gas at a high velocity and at least a pair of discharge electrodes (not shown) for obtaining electric discharge for enabling oscillation of the laser beam. The rotating fan 12 has a rotating shaft 13 protruding from opposite ends thereof and the rotating shaft 13 is magnetically supported in a floating condition by two radial magnetic bearings 14 and one axial magnetic bearing 15. An electric motor 16 for rotating the fan 12 is provided on a side opposite to the axial magnetic bearing 15.

FIG. 2 shows examples of the radial magnetic bearings 14 for magnetically supporting the rotating shaft of the fan in a floating condition and the electric motor 16 for rotating the shaft 13. Radial magnetic bearing targets 14-1 and 14-2 and displacement sensor targets 14-3 and 14-4 are fixed to the rotating shaft 13 of the rotating fan 12. As stationary elements, at least one pair of radial electromagnets, namely radial electromagnets 14-5a and 14-5b, are provided so as to face each other and have the radial magnetic bearing target 14-1 located therebetween. Further, at least one pair of radial electromagnets, namely radial electromagnets 14-6a and 14-6b, are provided so as to face each other and have the radial magnetic bearing target 14-2 located therebetween. Also as stationary elements, at least one pair of displacement sensors, namely displacement sensors 14-7a and 14-7b, are provided so as to face each other and have the displacement sensor target 14-3 located therebetween. Further, at least one pair of displacement sensors, namely displacement sensors 14-8a and 14-8b, are provided so as to face each other and have the displacement sensor target 14-4 located therebetween. The electric motor 16 comprises an armature 16-1 fixed to the rotating shaft 13 and a stationary element or stator 16-2.

Position indicating signals delivered from the displacement sensors 14-7a, 14-7b, 14-8a and 14-8b are processed in a signal processing circuit 21 and transmitted to an exciting electric power control 22, which in turn controls exciting currents applied to the radial electromagnets 14-5a, 14-5b, 14-6a and 14-6b, to thereby control the rotating shaft 13 so that it is adjusted to a target position between the radial electromagnets 14-5a and 14-5b and a target position between the radial electromagnets 14-6a and 14-6b. The signal processing circuit 21 comprises a preamplifier 21-1, an adding circuit 21-2, an offset output unit 21-3 and a gain controllable circuit 21-4. The exciting electric power control 22 comprises a phase compensating circuit 22-1 and an electromagnet driving circuit 22-2. The signal processing circuit 21 and the exciting electric power control 22 provide the control device 20 for controlling the magnetic bearings for the excimer laser.

Thus, the displacement sensors 14-7a, 14-7b, 14-8a and 14-8b generate the signals indicating the positions of the displacement sensor targets 14-3 and 14-4 (the position of the rotating shaft 13). The signals are processed in the signal processing circuit 21 of the control device 20 and by means of an electromagnet exciting current obtained by the exciting electric power control 22, a magnetic attracting force or magnetic repulsive force generated in the radial electromagnets 14-5a and 14-5b and a magnetic attracting force or magnetic repulsive force generated in the radial electromagnets 14-6a and 14-6b are controlled, to thereby control non-contact magnetic floating support of the radial magnetic bearing targets 14-1 and 14-2 fixed to the rotating shaft 13 at respective target positions between the radial electromagnets 14-5a and 14-5b and between the radial electromagnets 14-6a and 14-6b.

Although not shown, in the axial magnetic bearing 15, a displacement sensor detects an axial displacement of the rotating shaft 13 and the signal is processed in the signal processing circuit 21 of the control device 20, to thereby control an exciting current applied to an axial electromagnet.

As the displacement sensors 14-7a, 14-7b, 14-8a and 14-8b which are used in conventional magnetic bearings, use is generally made of a non-contact type displacement sensor which electromagnetically detects a displacement, such as a magnetic self-excited oscillation type sensor.

Thus, radial displacement of the rotating shaft 13 (the radial magnetic bearing targets 14-1 and 14-2) between the stationary radial electromagnets is detected by the sensors. In order to output the signals from the sensors at a predetermined level of sensitivity, it is required to conduct adjustments in the signal processing circuit 21 during assembly of the magnetic bearings.

However, in the above-mentioned conventional technique, the signal processing circuit 21, which processes the position indicating signals from the displacement sensors 14-7a, 14-7b, 14-8a and 14-8b for use in controlling magnetic floating support of the shaft 13, is contained in the control device 20. That is, a mechanism for adjustment of the sensitivity is located in the control device. Therefore, when replacement of either a magnetic bearing mechanism body or the control device is conducted, an operation for re-adjustment is necessary for enabling the signal processing circuit to have properties suitable for the bearing mechanism body.

In order to reduce such an operation for re-adjustment, there has been employed a technique in which variations in manufacturing tolerances or variations in material properties of the bearing mechanism bodies are minimized at the time of completion of assembly, so as to prevent variations in outputs of the displacement sensors 14-7a, 14-7b, 14-8a and 14-8b. In this technique, there is no apparent difference between individual bearing mechanism bodies.

However, a difference between individual bearing mechanism bodies cannot be completely eliminated by the above-mentioned technique. In practice, it is only possible to minimize such a difference by putting tolerances of individual parts under highly strict control and suppressing dimensional tolerances generated in the course of assembly to a level within a predetermined allowable range. In addition, a selection operation is necessary and assembled parts having tolerances exceeding beyond the allowable range are subjected to additional processing or disposal, thereby lowering a yield. This makes it difficult to achieve an appropriate level of cost reduction which should normally result from mass production.

SUMMARY OF THE INVENTION

In view of the above, the present invention has been made. It is an object of the present invention to provide an excimer laser or electric discharge gas laser in which a mechanism for adjusting displacement sensors is provided in a magnetic bearing mechanism body, which enables a difference between individual bearing mechanism bodies to be eliminated in design terms by means of the adjusting mechanism, and which insures easy replacement of either the magnetic bearing mechanism body or a control device, to thereby achieve a reduction in cost of an entire system.

In accordance with the present invention, there is provided an electric discharge gas laser comprising: a housing containing a gas used for generating a laser beam; a rotating fan provided in the housing to circulate the gas in the housing, the rotating fan having a rotating shaft; a bearing device for magnetically supporting the shaft of the rotating fan in a floating condition, the bearing device being provided with a sensor device comprising a sensor for sensing the position of the rotating shaft relative to the bearing device to generate signals indicating the position of the rotating shaft, and a signal processor for receiving and processing the signals delivered from the sensor to output processed signals; and a control separated from the bearing device and functionally associated with the bearing device to receive the processed signals from the sensor device for controlling the bearing device on the basis of the processed signals.

The signal processor processes the signals delivered from the sensor so as to output the processed signals at a predetermined level of sensing sensibility of the sensor device. Specifically, the signal processor includes a circuit for delivering signals indicating a displacement of rotation shaft from a target position thereof on the basis of the signals delivered from the sensor and a gain controllable amplifier for adjusting an amplitude of the signals delivered from the above-noted circuit.

According to the electric discharge gas laser, variations in signals delivered from displacement sensors due to manufacturing errors of the bearing mechanism bodies can be adjusted to a predetermined level at a manufacturing stage.

Further, it has become possible to conduct initial adjustments of various properties of the magnetic bearing mechanism body so that there is no difference between individual bearing mechanism bodies in terms of a control device for controlling magnetic floating support of the bearing mechanism body. When either the bearing mechanism body or the control device is replaced, it is unnecessary to conduct adjustments in the control device.

The foregoing and other objects, features and advantages of the present invention will be apparent from the following detailed description and appended claims taken in connection with the accompanying drawings.

DETAILED DESCRIPTION OF THE INVENTION

Hereinbelow, an embodiment of the present invention is described, with reference to the accompanying drawings.

Figure 1:
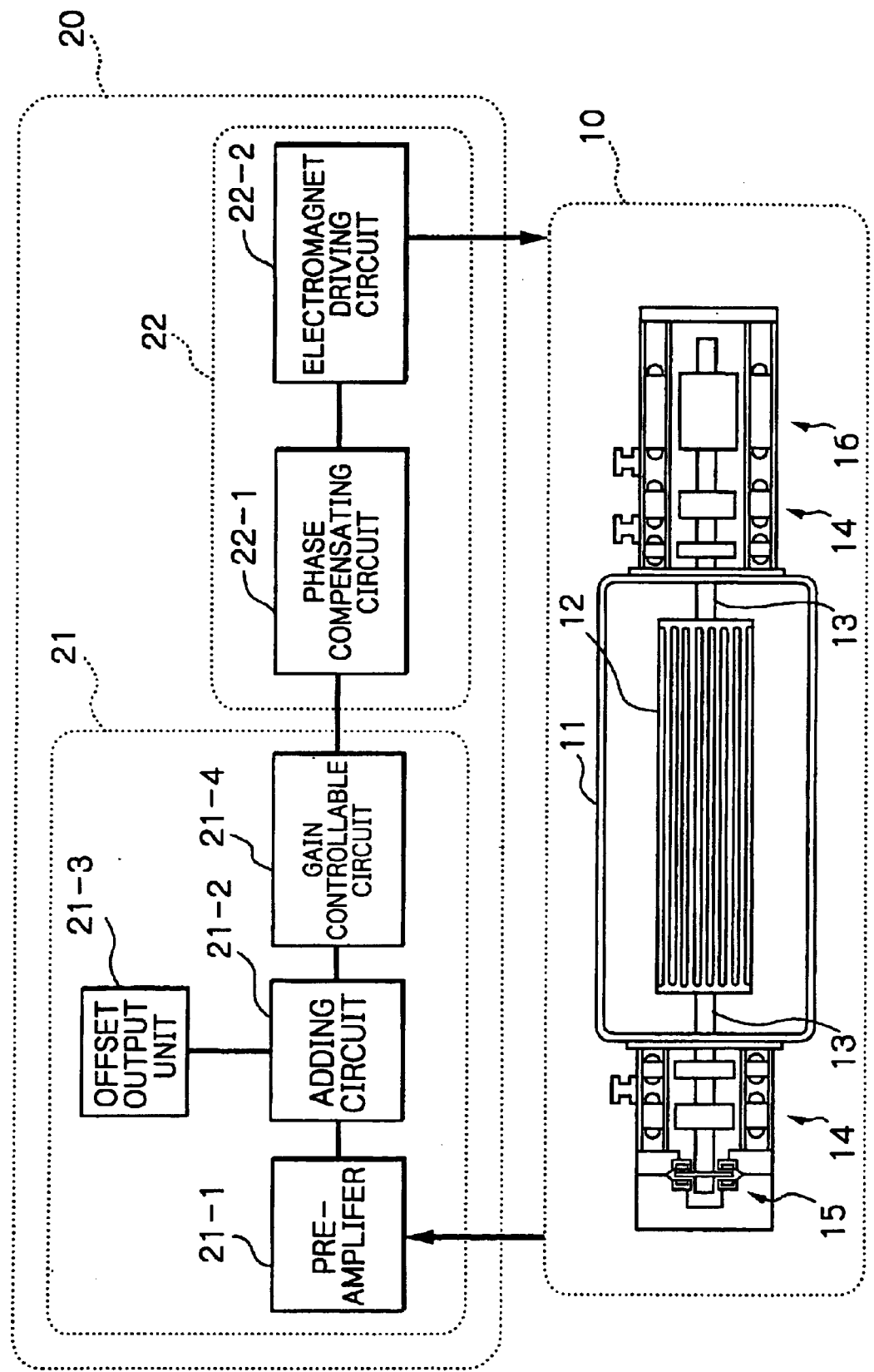
FIG. 1 shows an example of an arrangement of a conventional excimer laser.
Figure 2:
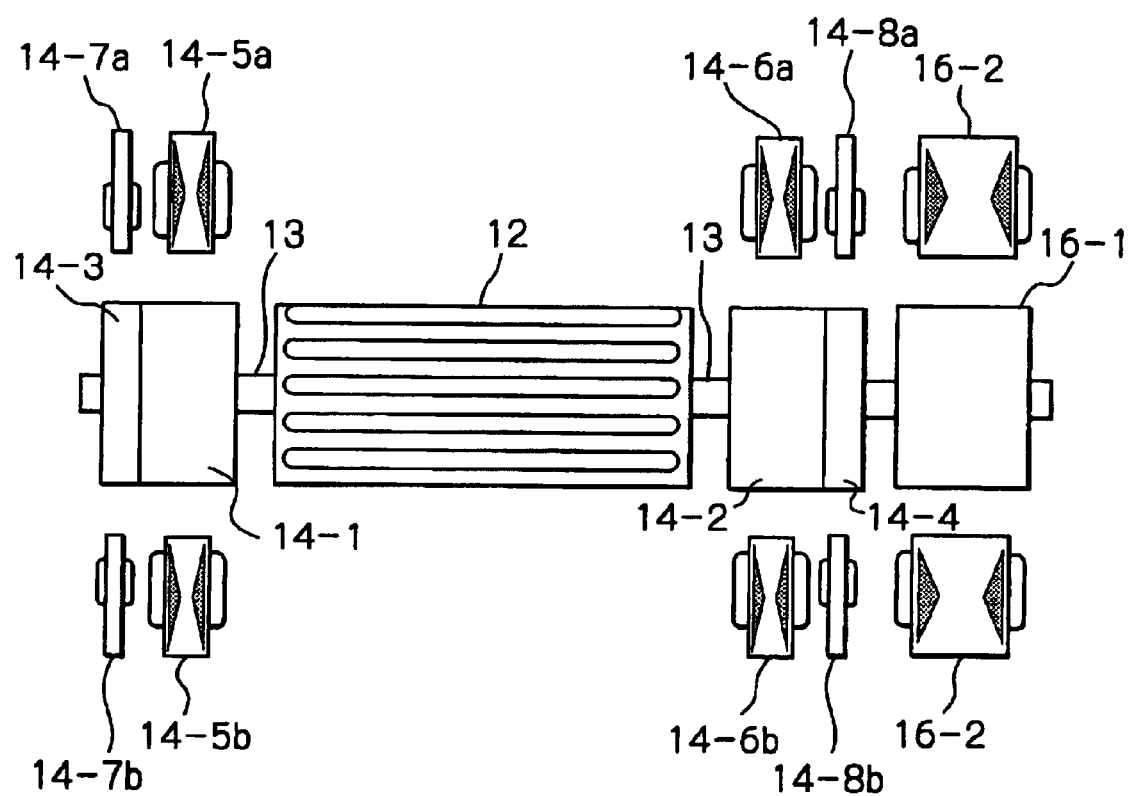
FIG. 2 shows examples of radial magnetic bearings and an electric motor of the excimer laser of FIG. 1.
Figure 3:
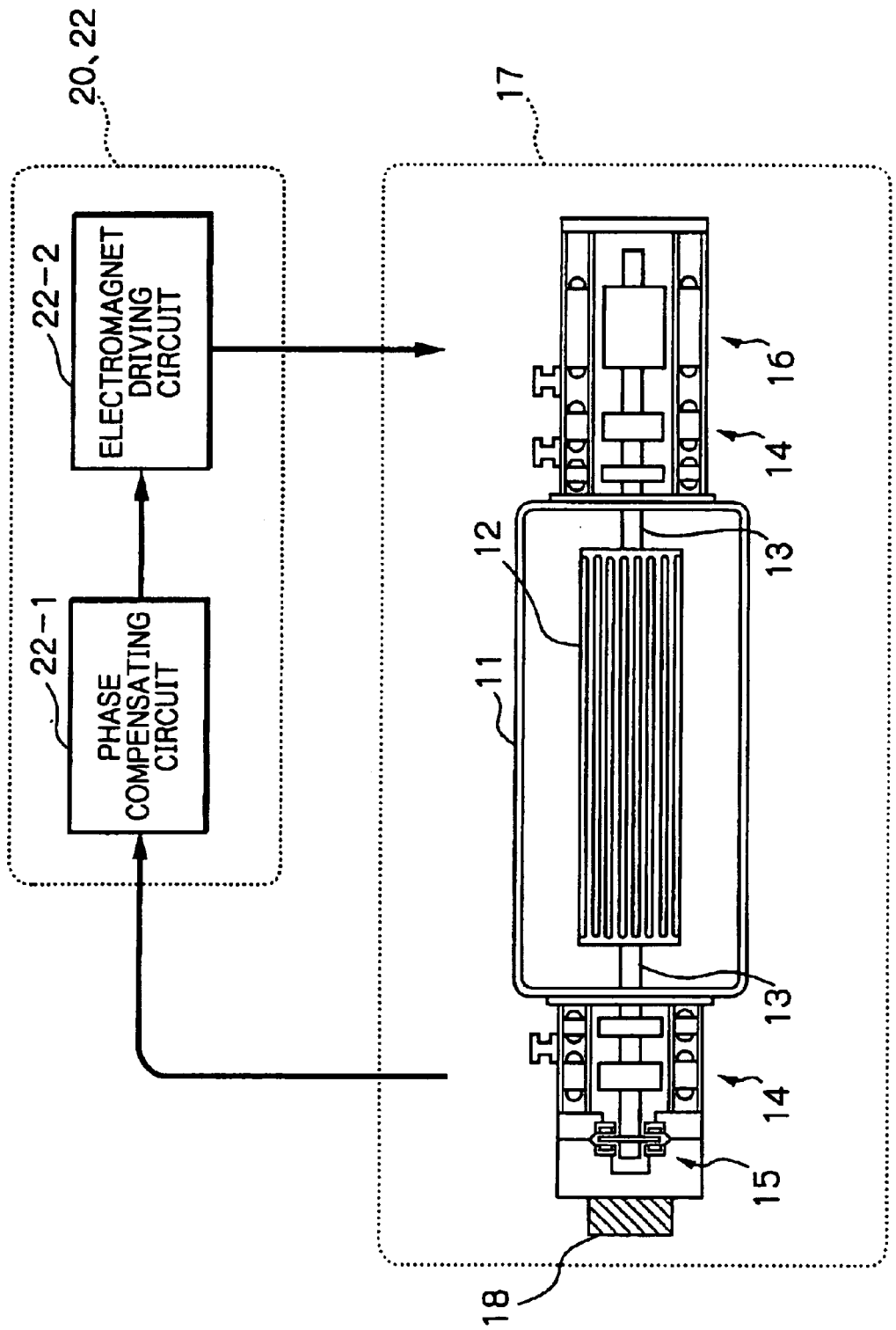
FIG. 3 shows an example of an arrangement of an excimer laser of the present invention.

FIG. 3 shows an arrangement of an excimer laser according to an embodiment of the present invention. As shown in FIG. 3, this excimer laser comprises a magnetic bearing mechanism body 17 (corresponding to the laser body 10 in FIG. 1) provided with a signal processing circuit 18. The control device 20 consists of the exciting electric power control 22 comprising the phase compensating circuit 22-1 and the electromagnet driving circuit 22-2.

Figure 4:
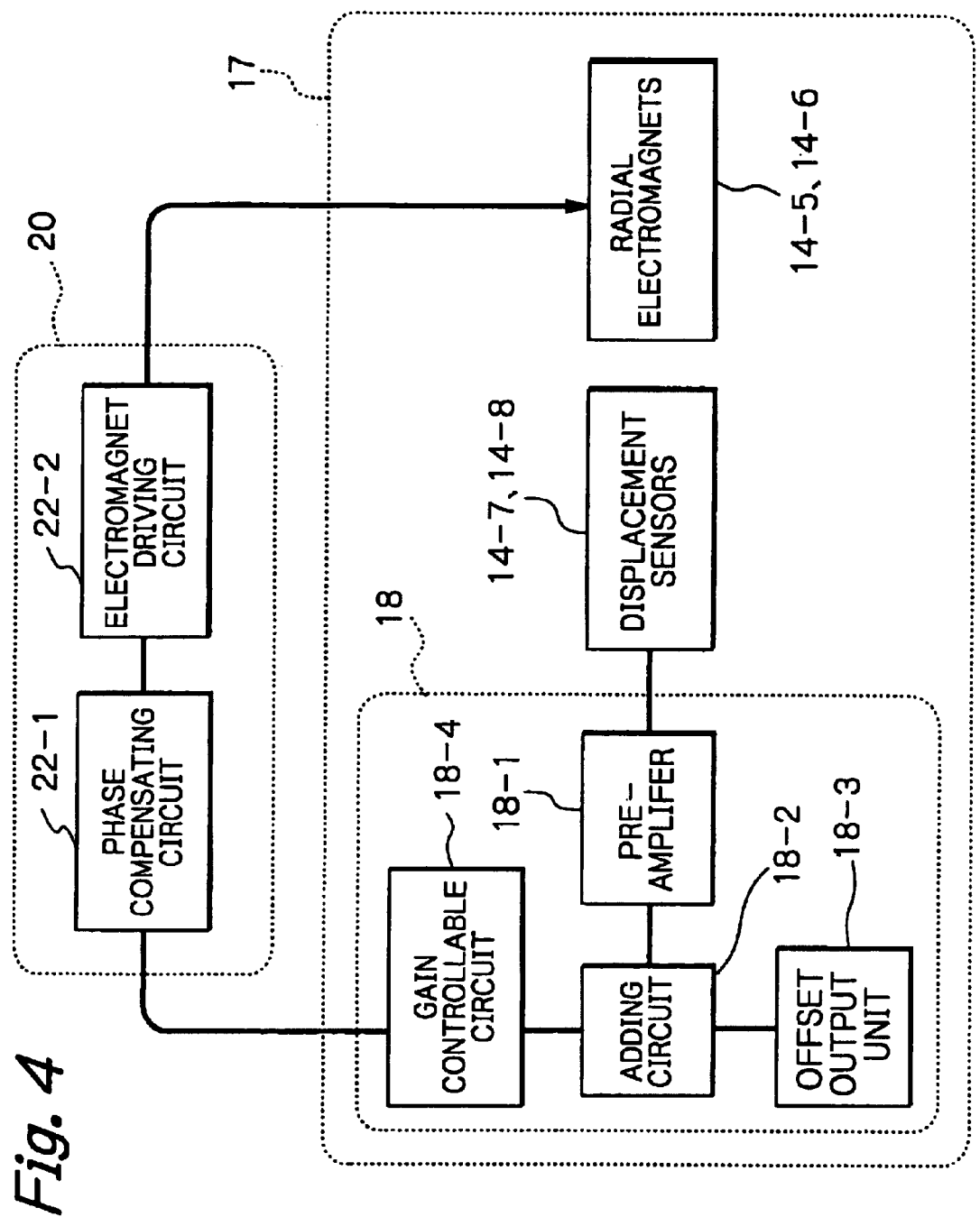
FIG. 4 shows an arrangement of a signal processing circuit of a magnetic bearing device of the excimer laser of the present invention and a relationship between a magnetic bearing mechanism body and a control device.

FIG. 4 shows an arrangement of the signal processing circuit 18 and a relationship between the magnetic bearing mechanism body 17 and the control device 20. As in the case of the signal processing circuit 21 shown in FIG. 1, the signal processing circuit 18 comprises a pre-amplifier 18-1, an adding circuit 18-2, an offset output unit 18-3 and a gain controllable circuit 18-4. The signal processing circuit 18 is provided in the magnetic bearing mechanism body 17. Thus, in the magnetic bearing mechanism body 17 of the excimer laser, position indicating signals delivered from displacement sensors 14-7 and 14-8 are preliminarily processed in the signal processing circuit 18 for adjustment so as to eliminate an error in sensitivity due to variations in terms of the structure of the magnetic bearing mechanism body 17.

Thus, the signal processing circuit 18 is provided within the magnetic bearing mechanism body 17 of the excimer laser and the signals from the displacement sensors 14-7 and 14-8 indicating the position of the shaft are processed in the pre-amplifier 18-1, to thereby obtain signals which can be easily processed. In the adding circuit 18-2, the signals outputted from the pre-amplifier 18-1 as position indicating signals are added to offset adjusting signals outputted from the offset output unit 18-3 for offset adjustment. As a final output adjustment, the signals are adjusted to a predetermined level of sensitivity in the gain controllable circuit 18-4, and outputted from the magnetic bearing mechanism body 17 to the control device 20 as displacement signals.

Thus, the level of sensitivity for outputting the signals from the sensors is preliminarily determined, so that an exciting current applied to the radial electromagnets 14-5 and 14-6, which is outputted from the electromagnet driving circuit 22-2 in response to the displacement signals passing through the phase compensating circuit 22-1 in the control device 20, is maintained at a certain level relative to the displacement signals even when the magnetic bearing mechanism body 17 is replaced. Although not shown, in the axial magnetic bearing, a signal processing circuit for processing a position indicating signal is provided in the magnetic bearing mechanism body 17 and, in the same manner as in the case of the radial magnetic bearings, the signal is adjusted to a predetermined level of sensitivity and outputted to the control device 20.

Similarly, when the control device 20 is replaced, the exciting current outputted through the phase compensating circuit 22-1 and the electromagnet driving circuit 22-2 is maintained at a certain level relative to the displacement signals as long as the control device 20 having the same input/output characteristics is used. Therefore, even when either the control device 20 or the magnetic bearing mechanism body 17 is replaced, the performance of the magnetic bearings can be maintained at a certain level.

Figure 5:
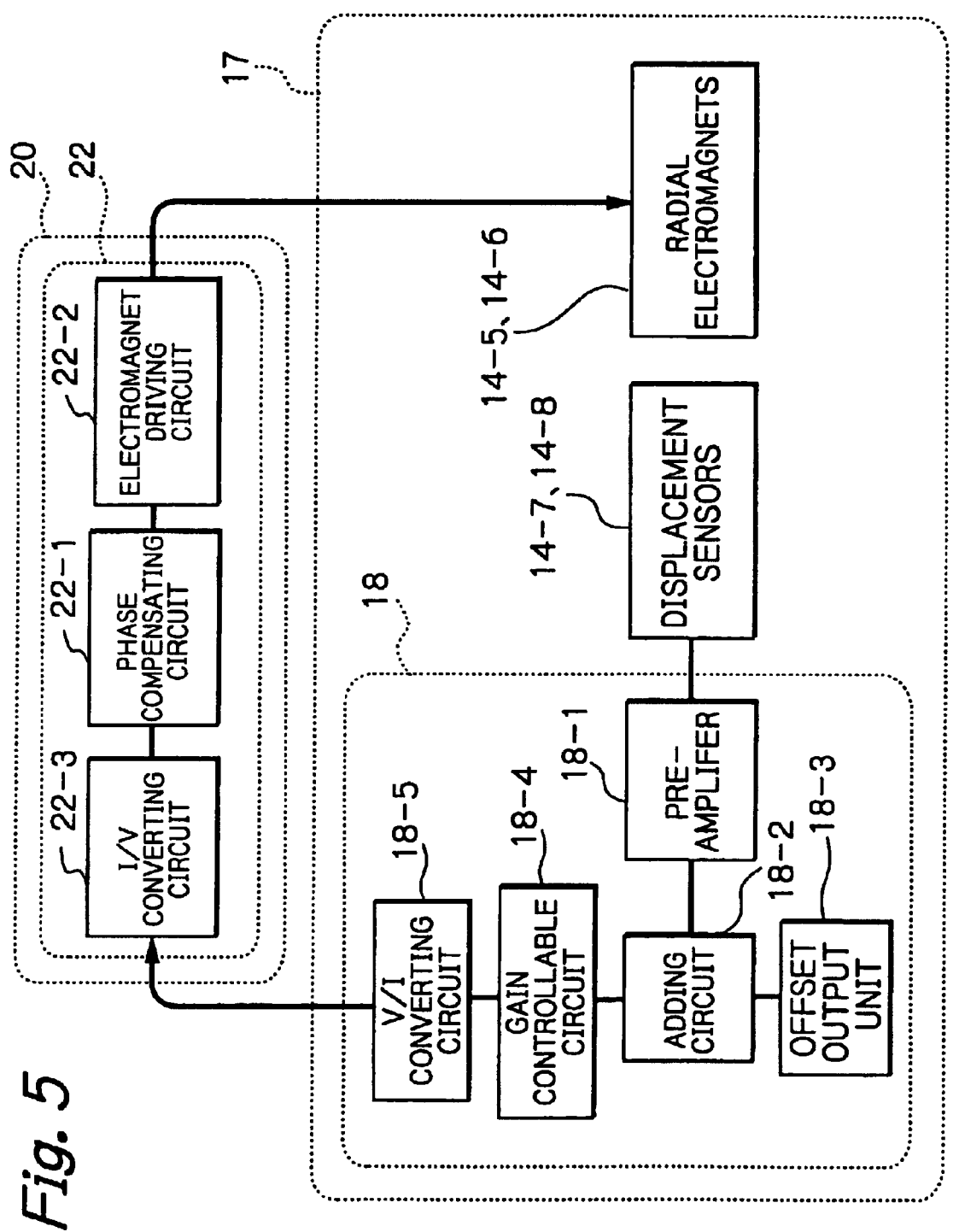
FIG. 5 shows arrangements of the signal processing circuit and the control device and the relationship between the bearing mechanism body and the control device.

FIG. 5 shows arrangements of the signal processing circuit and the control device and the relationship between the bearing mechanism body and the control device. In this example shown in FIG. 5, a voltage/current (V/I) converting circuit 18-5 is connected to an output side of the gain controllable circuit 18-4 of the signal processing circuit 18 provided in the magnetic bearing mechanism body 17 and a current/voltage (I/V) converting circuit 22-3 is connected for input to the control device 20. By this arrangement, even when a signal cable extending between the magnetic bearing mechanism body 17 and the control device 20 is extremely long, transmission of signals through the cable is not affected.

Although not shown, an A/D converting circuit and a D/A converting circuit may be provided between the magnetic bearing mechanism body 17 and the control device 20 for input/output of signals, so as to enable digitized signal transmission.

As has been described above, the present invention is advantageous in the following points.

It has become possible to adjust variations in signals delivered from displacement sensors due to manufacturing errors of the magnetic bearing mechanism bodies to a predetermined level at a manufacturing stage. Therefore, replacement of either the magnetic bearing mechanism body or the control device can be easily conducted. Further, cost of production can be reduced, thus making it possible to provide an excimer laser comprising a magnetic bearing device for supporting a shaft of a gas-circulating fan, which is reliable and can be produced at low cost.

Further, it has become possible to conduct initial adjustments of various properties of the magnetic bearing mechanism body so that there is no difference between individual bearing mechanism bodies in terms of a control device for controlling magnetic floating support of the bearing mechanism body. When either the bearing mechanism body or the control device is replaced, it is unnecessary to conduct adjustments in the control device and the replacement can be easily conducted.

What is claimed is:

1. An electric discharge gas laser comprising:

a laser body including a housing capable of containing a gas capable of generating a laser beam, a rotating fan provided in said housing to circulate the gas in said housing, said rotating fan having a rotating shaft, and a bearing device operable to magnetically support said rotating shaft in a floating condition, said bearing device including a sensor device comprising a sensor operable to sense the position of said rotating shaft relative to said bearing device to generate signals indicating the position of said rotating shaft; and a control device including a signal processor operable to receive and process the signals delivered from said sensor to output processed signals, and an exciting electric power control operable to receive the processed signals from said signal processor and to generate, on the basis of the processed signals, an electromagnet exciting current for controlling said bearing device, wherein said signal processor is provided in said laser body and said exciting electric power control is separated from said laser body.

2. An electric discharge gas laser as set forth in claim 1, wherein said signal processor is operable to process the signals delivered from said sensor so as to output the processed signals at a predetermined level of sensitivity of said sensor device.

3. An electric discharge gas laser as set forth in claim 2, wherein said signal processor includes a circuit operable to generate and deliver signals indicating a displacement of said rotating shaft from a target position thereof on the basis of the signals delivered from said sensor and a gain controllable amplifier operable to adjust an amplitude of the signals delivered from said circuit.

* * * * *